United States Patent [19]

Corsi

[11] Patent Number: 5,010,720
[45] Date of Patent: Apr. 30, 1991

[54] TRIMMER GUARD AND GUIDE ASSEMBLY

[76] Inventor: Louis V. Corsi, 205 N. Charity St., Bethel, Ohio 45106

[21] Appl. No.: 543,629

[22] Filed: Jun. 26, 1990

Related U.S. Application Data

[63] Continuation-in-part of Ser. No. 393,414, Aug. 14, 1989, abandoned.

[51] Int. Cl.$^5$ .............................................. A01D 34/67
[52] U.S. Cl. .............................. 56/320.1; 56/DIG. 24
[58] Field of Search ............ 56/320.1, 320.2, DIG. 24, 56/239

[56] References Cited

U.S. PATENT DOCUMENTS

| | | | |
|---|---|---|---|
| 4,069,651 | 1/1978 | Steffen | 56/320.1 |
| 4,756,147 | 7/1988 | Savell | 56/320.1 X |

FOREIGN PATENT DOCUMENTS

| | | | |
|---|---|---|---|
| 3418291 | 4/1986 | Fed. Rep. of Germany | 56/320.1 |
| 1584495 | 2/1981 | United Kingdom | 56/320.1 |

Primary Examiner—Thuy M. Bui
Attorney, Agent, or Firm—Frost & Jacobs

[57] ABSTRACT

A guard and guide for a powered, hand-operated, grass and weed trimmer having a trimming filament segment extending from a rotating spool thereof. The trimmer comprises an elongated tubular body having a forward end and a rearward end. The trimming filament segment and its spool are rotatively supported at the forward end of the trimmer body and are rotatable at high speed by operative connection to an internal combustion or electric prime mover. The guard and guide comprises an element having a forward portion having a substantially semi-circular peripheral configuration and an upwardly, inwardly and rearwardly extending rearward portion operatively attached to the trimmer body. This attachment is both adjustable and pivotable, the guide and guard being pivotable between a retracted inoperative position with its forward portion abutting the trimmer body and an extended operative position wherein the guard and guide forward portion extends away from the operator and overlies the forward portion of the path of travel of the trimming filament segment, extending slightly beyond the free end of the trimming filament segment to prevent contact of an object being trimmed about by the trimming filament segment to prevent damage to the object (such as a tree trunk) and to lengthen the useful life of the trimming filament segment.

18 Claims, 12 Drawing Sheets

TRIMMER GUARD AND GUIDE ASSEMBLY

REFERENCE TO RELATED APPLICATION

The present application is a Continuation-In-Part of co-pending application SN 07/393,414, filed Aug. 14, 1989, now abandoned in the name of Louis V. Corsi and entitled TREE GUARD —TYPE "A."

TECHNICAL FIELD

The invention relates to a guard and guide assembly for a powered, hand-held grass and weed trimmer of the type wherein the trimming is accomplished by a rotating filament, and more particularly to such a guard and guide assembly which helps to guide the trimmer about an object, while precluding damage to the object by the rotating filament.

BACKGROUND ART

In recent years powered, hand-held, weed and grass trimmers, of the type utilizing a rotating filament to accomplish the trimming, have come into widespread commercial and home use. Such trimmers are generally characterized by an elongated body in the form of a tubular shaft having forward and rearward ends. A spool of the cutting filament is replaceably mounted at the forward end of the trimmer and a length or segment of the filament is unwound from the spool so as to perform the trimming action as the spool is rotated at high speed. When the segment of filament becomes worn or broken, an additional segment is unwound from the spool. This is repeated until the spool is empty, whereupon it is replaced by a new filament spool. In some models of trimmers, the filament spool can be replaced by a rotating blade. The elongated tubular body of the trimmer is generally provided with one or more hand hold means, by which the trimmer may be grasped and controlled by the operator.

Such trimmers generally fall into two basic categories. The first category encompasses those trimmers powered by an internal combustion engine. The engine is normally mounted at the rearward end of the shaft-like body. The shaft of the engine is connected to the spool to impart rotation thereto either by gear means, or flexible shaft means.

The second category of trimmers relates to those trimmers powered by an electrical motor. The electrical motor is normally mounted adjacent the spool at the forward end of the trimmer. Models have been devised with an internal combustion engine mounted at the forward end adjacent the spool or with an electric motor mounted at the rearward end of the trimmer body, but such models are encountered less frequently.

In some trimmer models, the forward end of the trimmer is provided with shield means facing the operator, to protect the operator form the rotating filament as well as sticks, gravel, stones and other debris which might otherwise be thrown toward the operator by the rotating filament.

Trimmers of the type just described are efficient and enable trimming to be accomplished more easily and quickly than heretofore. Nevertheless, they do have certain common drawbacks. For example, when trimming around trees, bushes and the like, if the trimmer is brought too close to the tree, the rotating filament (or blade) can contact the tree bark resulting in injury and/or permanent damage to the tree. Similarly, when trimming around structures such as walls, buildings, cemetery markers and the like, if the trimmer is brought too close to the structure so that the structure is contacted by the rotating filament (or blade), the structure may be marred and the filament (or blade) will be subjected to rapid wear.

The present invention is based upon a guard and guide assembly which may be quickly and easily mounted on conventional weed and grass trimmers of the types described. The primary purpose of the guard and guide assembly is to prevent damage to tree bark and plant stems. It also serves as a guide for trimming around structures and the like, thus extending the life of the filament. When the guard and guide of the assembly is not needed, it may be folded back to lay on the trimmer shaft-like body, thus enabling the operator to use the trimmer in a normal mode. For purposes of an exemplary showing, the invention will be described with respect to trimmers provided with a filament spool and filament segment. It will be understood, however, that when a blade can be used to replace a filament spool, the guard and guide assembly of the present invention will serve the same purposes.

DISCLOSURE OF THE INVENTION

According to the invention there is provided a guard and guide assembly for a powered, hand-operated, grass and weed trimmer of the type having a trimming filament segment extending from a rotating spool of the filament. The trimmer comprises an elongated tubular body having a forward end and a rearward end. The trimming filament segment and its spool are rotatively supported at the forward end of the trimmer body. The trimming filament segment and its spool are rotatable at high speed, by operative connection to the shaft of a prime mover such as an internal combustion engine or an electric motor.

The guard and guide of the assembly comprises an element having a forward portion with an arcuate peripheral configuration and an upwardly and rearwardly extending rearward portion operatively attached to the trimmer body. The guard and guide may be made of rod stock. To this end, a piece of rod stock is formed into an arc. The ends of the arc terminate in leg portions which extend inwardly, upwardly and rearwardly. Those parts of the leg portions adjacent the free ends thereof are oriented in parallel spaced relationship.

The attachment of the guard and guide to the trimmer tubular body is both adjustable and pivotable, the guard and guide being pivotable between a retracted inoperative position with its forward arcuate portion abutting the trimmer body and an extended operative position wherein the guard and guide forward arcuate portion extends away from the operator and overlies the forward portion of the path of travel of the trimming filament segment, extending slightly beyond the free end of the trimming filament segment. When the guard and guide is affixed directly to the trimmer body, the parallel end parts of the guard and guide leg portions are adjustably and fixedly mounted in pivot members rotatively supported at opposite ends of a mounting block clamped to the trimmer body. When indirectly attached to the trimmer body, the parallel end parts of the guard and guide leg portions are adjustably and fixedly mounted in pivot members rotatively supported at opposite ends of a mounting block clamped to a rectilinear, tubular, auxiliary body element attached to the trimmer body parallel thereto and spaced rearwardly thereof.

When the guard and guide is in its extended operative position, it precludes contact of an object being trimmed about (such as a tree trunk, structure, or the like) by the trimming filament segment, to prevent damage to the object and to lengthen the useful life of the trimming filament segment.

DETAILED DESCRIPTION OF THE INVENTION

Figure 1:
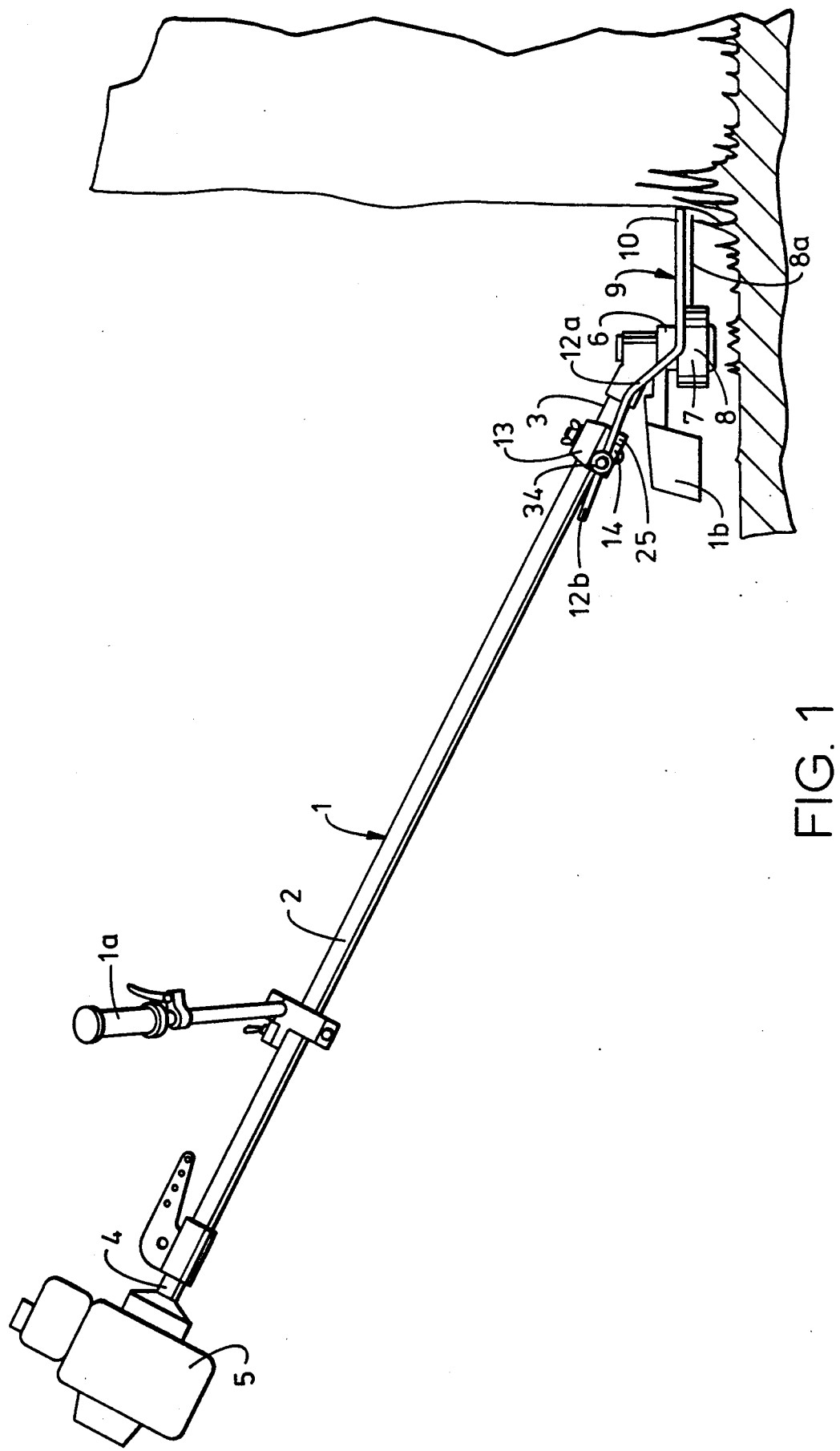
FIG. 1 is a side elevational view of a trimmer provided with one embodiment of the guard and guide assembly of the present invention.
Figure 2:
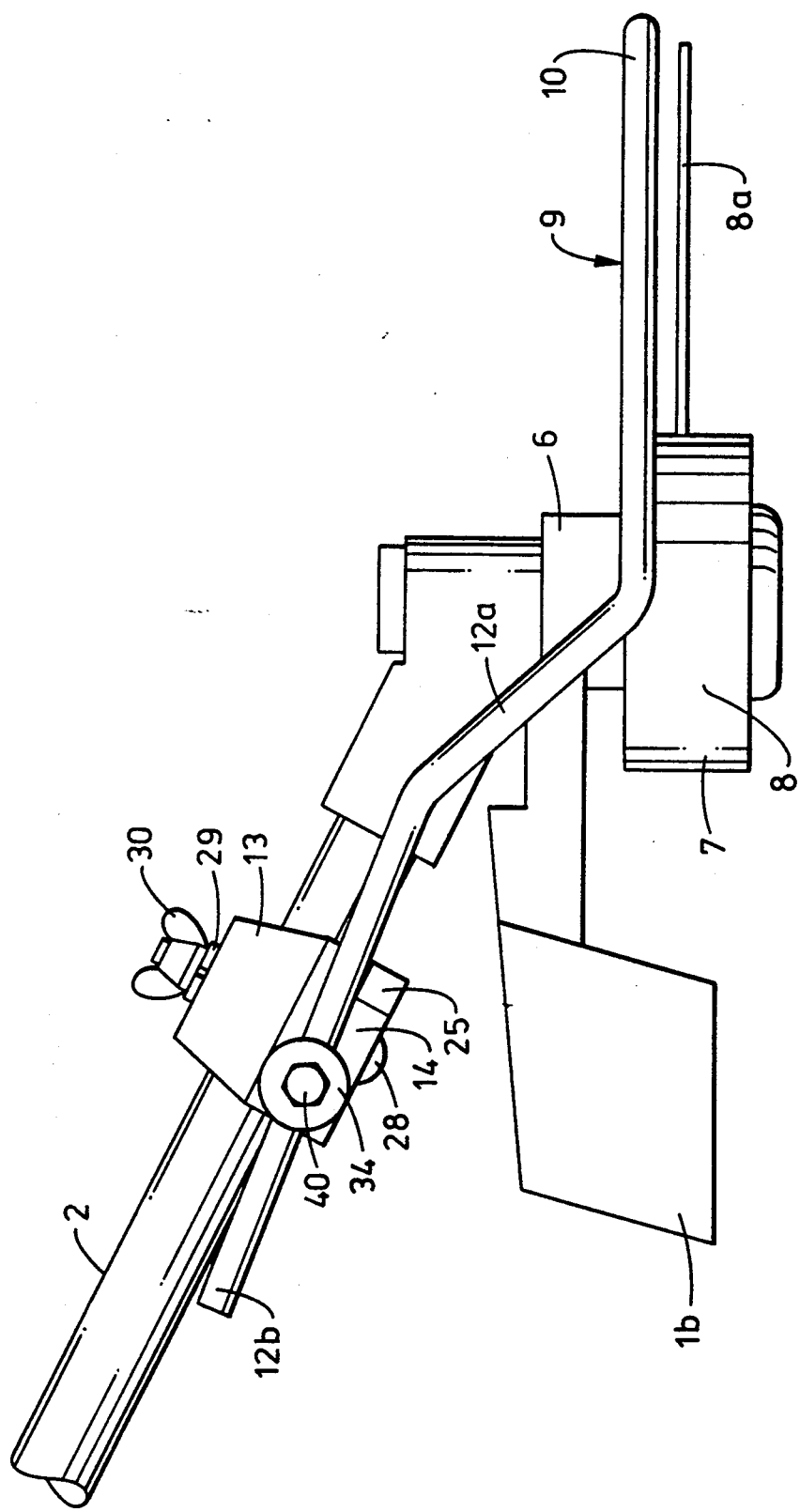
FIG. 2 is an enlarged fragmentary side elevational view of the structure of FIG. 1.

Reference is made to FIGS. 1-4 wherein a first embodiment of the present invention is illustrated and wherein like parts have been given like index numerals. In FIGS. 1 and 2, a conventional gasoline engine powered grass and weed trimmer is shown in simplified form. The trimmer is generally indicated at 1 and comprises an elongated tubular body 2 having a forward end 3 and a rearward end 4. A gasoline powered internal combustion motor is illustrated at 5, mounted on the rearward end 4 of body 1. A head 6 is mounted on the forward end 3 of body 1. The head 6 rotatively mounts a spool 7 about which is wound a supply of tough, flexible, string-like filament 8. A segment 8a of the filament 8 extends from spool 7 and constitutes the weed or grass cutting element. The internal combustion engine 5 has a shaft (not shown) connected by means (not shown) extending through the tubular body 1, to a series of gears (not shown) located within head 6, by which the internal combustion engine 5 rotates spool 7 and trimming filament segment 8a at relatively high speed, all as in known in the art. The rapidly rotating filament segment 8a will trim weeds, grass and the like quickly and efficiently, as the filament segment 8a rotates.

The trimmer 1 is provided with means 1a by which it is manually grasped and operated by the user. The trimmer 1 may also have a shield means 1b to protect the operator.

The purpose of the present invention is to provide the trimmer 1 with a guard and guide assembly which will enable the trimmer 1 to be used around trees, bushes and the like while preventing the rotating filament segment 8a from contacting the bark thereof and doing damage thereto. Similarly, the guard and guide can be used while trimming around stationary structures such as walls, large rocks, grave markers and the like to preclude contact of the stationary structure by the filament segment 8a, thus preventing marring of the structure and wear of the filament segment 8a.

The guard and guide of the guard and guide assembly may be made of any suitable material, but preferably is made of tempered aluminum rod stock by virtue of its lightweight and non-rusting characteristics. The guard and guide is generally indicated at 9 and has a forward portion 10 formed into an arc. The forward arcuate portion 10 terminates at each of its ends in a rearward portion comprising legs 11 and 12. The leg 11 has a first portion 11a which extends rearwardly, upwardly and inwardly. The leg portion 11a terminates in a second leg portion 11b. The leg 12 is a mirror image of the leg 11, having an upwardly, inwardly and rearwardly extending first portion 12a and a second portion 12b. It will be noted that leg portions 11b and 12b are coplanar and in parallel spaced relationship.

Figure 3:
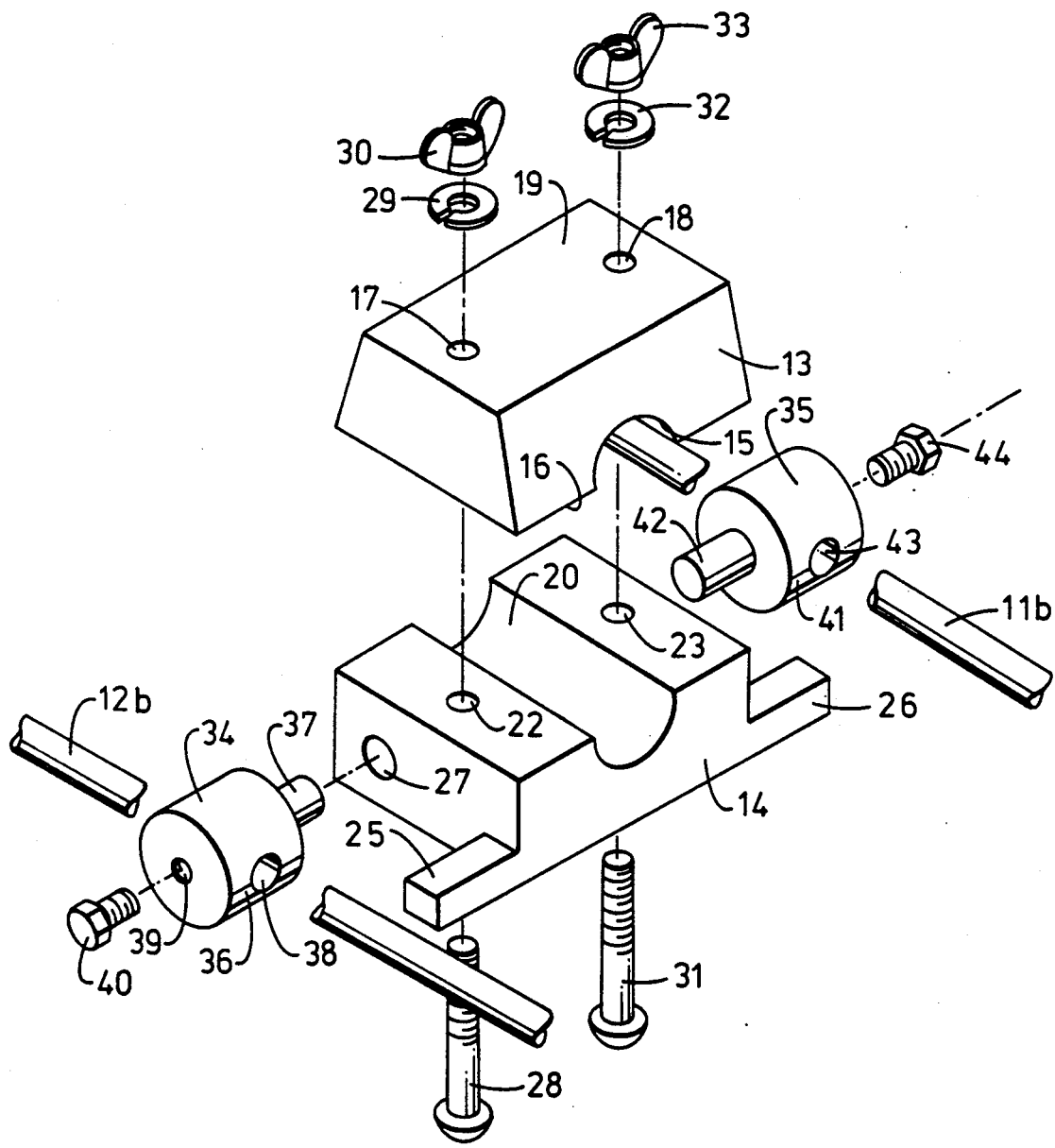
FIG. 3 is a fragmentary exploded view of the guard and guide assembly of FIG. 1.

Reference is made particularly to FIG. 3, wherein the upper mounting block 13 and the lower mounting block 14 are most clearly shown. Upper mounting block 13 has a semi-circular notch 15 formed in its lower face 16 and extending the width thereof. The upper mounting block has a pair of perforations 17 and 18 extending from its upper face 19 through its lower face 16.

The lower mounting block 14 has a semi-circular notch 20 formed in its upper face 21 and extending the width thereof. The lower mounting block also has a pair of perforations 22 and 23 extending from its upper surface 21 through its lower surface 24.

The lower mounting block 14 is provided with a pair of integral stops, 25 and 26. The stops 25 and 26 extend laterally from the ends of the lower mounting block 14. The ends of the lower mounting block 14 are also provided with coaxial bores, one of which is shown at 27. The purpose of stops 25 and 26 and the bores (one of which is shown at 27) will be apparent hereinafter.

Figure 4:
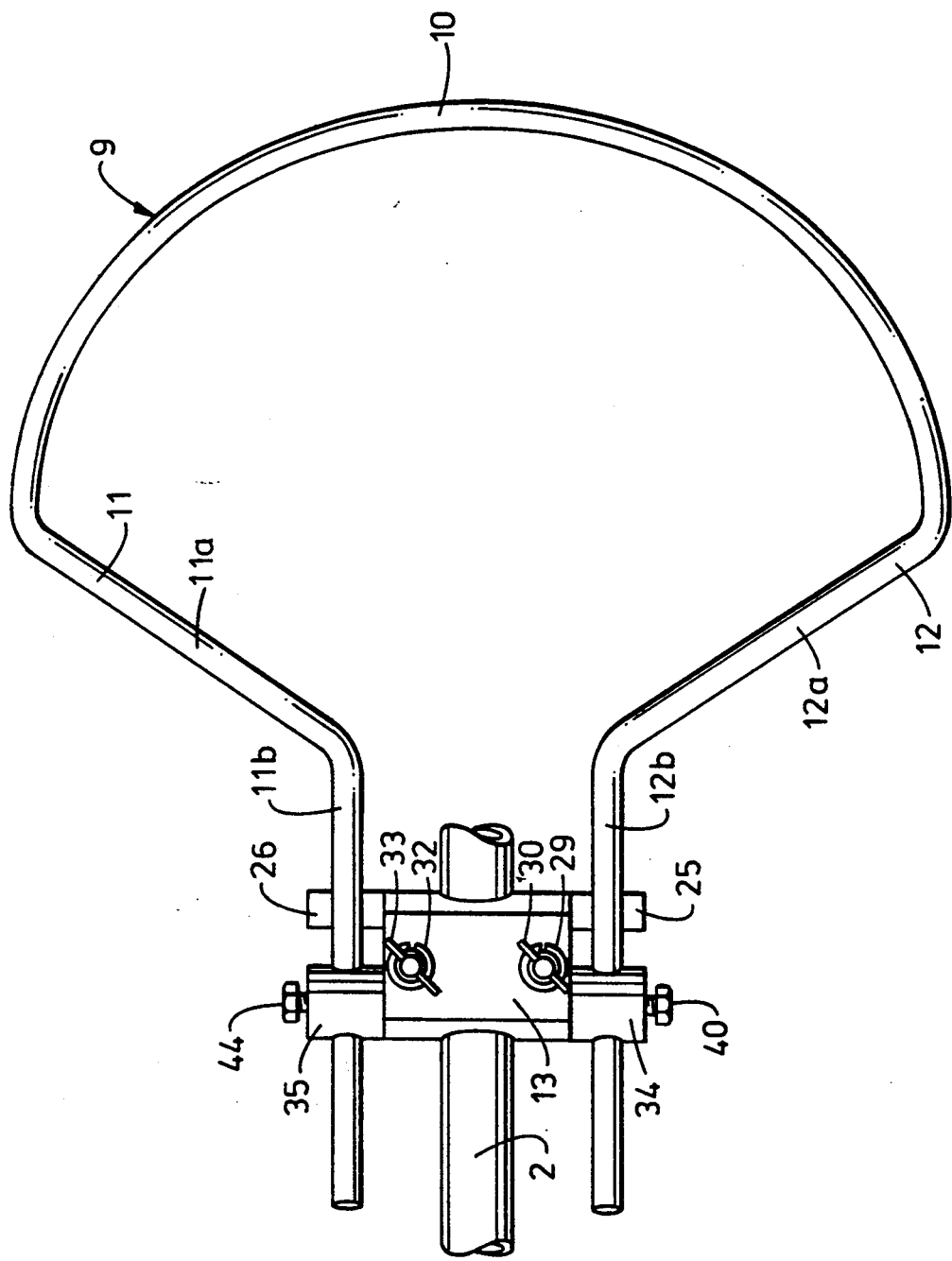
FIG. 4 is a fragmentary view of the structure of FIG. 1, as seen from the direction of arrow A of FIG. 2.

The upper and lower mounting blocks 13 and 14 are assembled on the tubular body 2 of the trimmer 1 with the lower face 16 of the upper mounting block adjacent the upper face 21 of the lower mounting block and the tubular body 2 of the trimmer 1 being located in the semi-circular notches 15 and 20. A bolt 28 is caused to extend through perforation 22 of lower mounting block 14 and perforation 17 of upper mounting block 13, and is provided with a flat washer 29 and a wing nut 30. Similarly, a bolt 31 is caused to pass through perforation 23 of lower mounting block 14 and perforation 18 of upper mounting block 13, and is provided with a flat washer 32 and a wing nut 33. When wing nuts 30 and 33 are tightened, the upper and lower mounting blocks 13 and 14 will engage the tubular body 2 of trimmer 1 with a clamping action, as shown in FIGS. 1, 2, and 4. It will be apparent to one skilled in the art that the clamping of upper and lower mounting blocks 13 and 14 on the tubular body 2 of trimmer 1 is adjustable axially of the tubular body 2.

The assembly is provided with a pair of pivot members 34 and 35. Pivot member 34 has a cylindrical body 36 from which a cylindrical stem 37 of lesser diameter extends. The cylindrical body 36 has a transverse bore 38 formed therein. The cylindrical body 36 also has an axial threaded bore 39 which intersects the transverse bore 38 and is adapted to receive bolt 40.

Pivot member 35 is identical to pivot member 34 having a cylindrical body 41, an axial stem 42, a transverse bore 43 and an axial threaded bore (not shown) identical to bore 39 and adapted to receive bolt 44.

The mounting of the guard and guide assembly is completed by inserting leg portions 11b and 12b of guard and guide 9 through the transverse perforations 43 and 38 of pivots 35 and 34, respectively. The guard and guide legs 11b and 12b are fixed in their respective pivot member perforations 43 and 38 by bolts 44 and 40, respectively, which engage the legs 11b and 12b in set screw fashion.

In FIGS. 1, 2, and 4 the guard and guide 9 is shown in its forward, extended, operative position which is determined by abutment of guard and guide leg portions 11b and 12b against lower mounting block stops 26 and 25, respectively. Final adjustment of the operative position of the guard and guide 9 can be made by loosening wing nuts 30 and 33 and sliding the entire guard and guide assembly up or down the tubular body 2 of trimmer 1. In addition, the bolts 44 and 40 may be loosened and the leg portions 11b and 12b may be axially shifted within pivot member bores 43 and 38, respectively.

When in its operative position, guard and guide 9 overlies the forward portion of the path of travel of filament segment 8a. The arcuate portion of the guard and guide 9 extends slightly beyond the free end of the filament segment 8a.

For trimming operations wherein the guard and guide 9 is not needed, the pivot members 34 and 35 enable the guard and guide 9 to be swung in the direction of arrow B (see FIG. 2) until the arcuate portion 10 of the guard and guide 9 rests against the tubular body 2 of trimmer 1 above mounting blocks 13 and 14.

For most installations, it has been found that the angle C should be about 35°. It will be understood that modification of angle C, the radius of the guard and guide arcuate portion 10, and the like, is well within the skill of the worker in the art, in order to properly fit a particular model of trimmer.

FIGS. 5, 6, 7 and 8 illustrate the application of the teachings of the present invention to another exemplary type of grass and weed trimmer. The trimmer is generally indicated at 45 and comprises an elongated tubular body 46 having a forward end 47 and a rearward end 48. Attached to the rearward end 48 there is a gasoline powered internal combustion engine 48a. Attached to the forward end of tubular body 46 there is a head 49 carrying a spool 50 of the thread-like filament 51. A segment 52 of the filament 51 extends from spool 50 and constitutes the means by which the grass and weeds are trimmed. The shaft (not shown) of the internal combustion engine is operatively connected to the spool 50 by a flexible shaft (not shown) extending within the trimmer tubular body 46. The tubular trimmer body 46 is similar to the tubular trimmer body 2 of FIG. 1 (being substantially rectilinear), with the exception that near its forward end 47 the tubular body 46 bends gently downwardly so that its forwardmost portion is substantially coaxial with the axis of spool 50.

The trimmer 45 is provided with means 45a and 45b by which it is manually grasped and operated by the user. The trimmer 45 may also have a shield 45c to protect the operator.

The guard and guide assembly of the embodiment of FIGS. 5–8 is supported on the tubular body 46 of trimmer 45. The assembly comprises a guard generally indicated at 53. Once again, the guard 53 may be made of tempered aluminum rod stock and comprises a forwardmost arcuate portion 54. The ends of the arcuate portion 54 terminate in legs 55 and 56. The leg 55 has a first portion 55a extending inwardly, and a second portion 55b extending upwardly and rearwardly. The leg 56 is a mirror image of leg 55, having an inwardly extending portion 56a and an upwardly and rearwardly extending portion 56b. It will be noted from FIG. 6 that the leg portions 55a and 56a are opposed and substantially coaxial. The leg portions 55b and 56b are coplanar and are in parallel spaced relationship.

Figure 5:
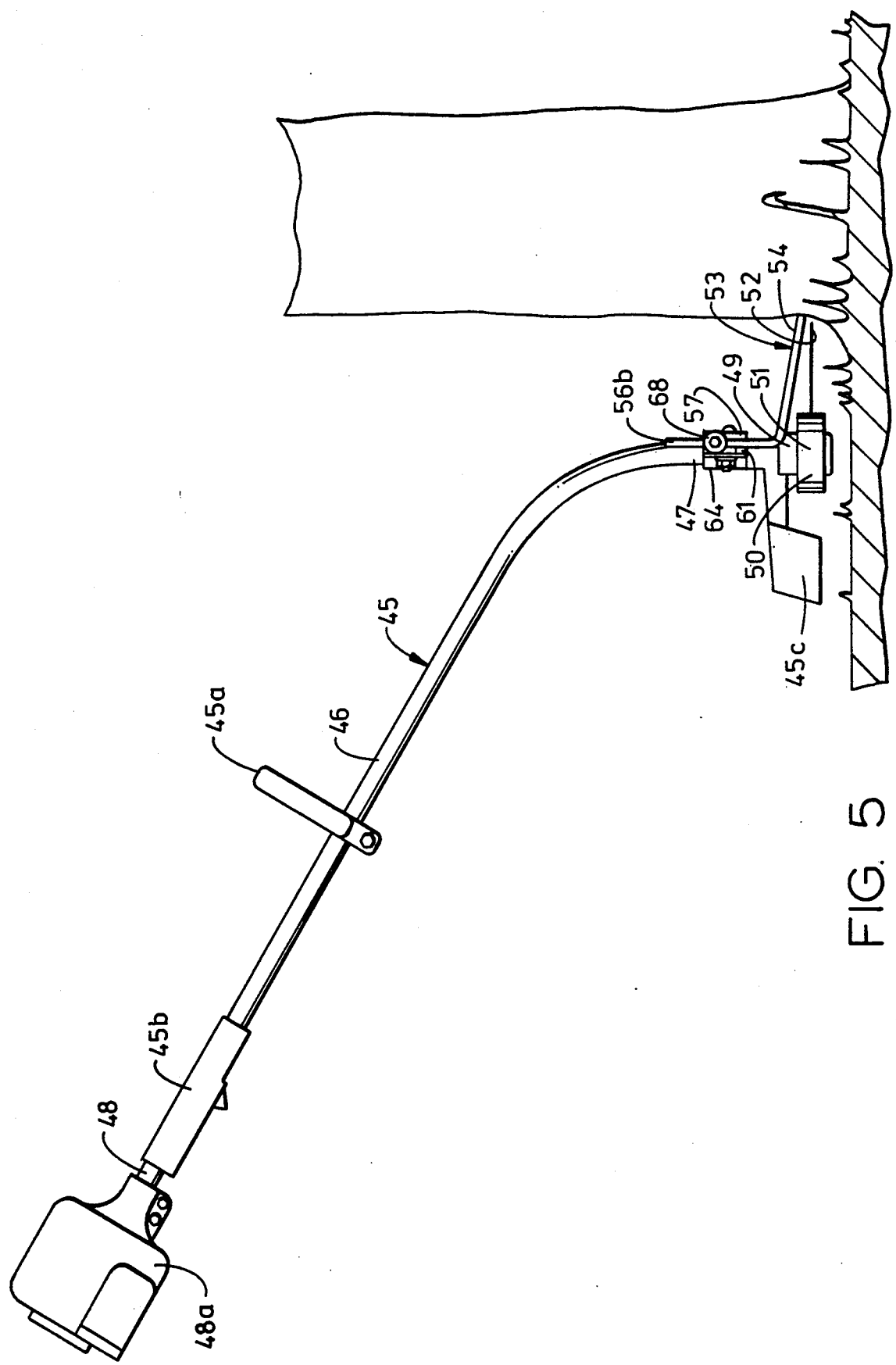
FIG. 5 is a side elevational view illustrating another trimmer and a second embodiment of the guard and guide assembly of the present invention.

In this embodiment, the guard and guide assembly includes a mounting block 57, best seen in FIG. 5. Mounting block 57 has a notch 58 formed in one of its faces, the notch 58 having a semi-circular cross-section. To either side of the notch 58, the mounting block 57 is provided with bores 59 and 60. At its ends, the mounting block 57 has a pair of laterally extending stops, 61 and 62. Also at its ends, mounting block 57 has a pair of coaxial bores, one of which is shown at 63. The mounting block 57 is provided with a clamping plate 64. The plate 64 has a transverse depression 65 of semi-circular cross-section formed therein. The clamping plate is completed by the provision of a pair of perforations 66 and 67.

Mounting block 57 is provided with a pair of pivot members 68 and 69 identical to the pivot members 34 and 35 of FIG. 2. Thus, pivot member 68 has a cylindrical body 70 provided with a cylindrical stem of lesser diameter 71. Cylindrical body 70 is provided with a transverse bore 72 and an axial threaded bore 73 which intersects bore 72. The threaded bore 73 is adapted to receive a bolt 74. Similarly, the pivot member 69 has a cylindrical body 75 with a cylindrical stem 76 of lesser diameter. The cylindrical body 75 has a transverse bore 77 formed therethrough and a threaded axial bore (not shown) equivalent to bore 73 and intersecting bore 77. Pivot member 69 also includes a bolt 78, equivalent to bolt 74. The assembly is completed by bolt 79, lock washer 80 and hex nut 81 together with bolt 82, lock washer 83 and hex nut 84.

The guard and guide assembly of this embodiment is affixed to the trimmer 45 in the following manner. Mounting block 57 is located on the trimmer tubular body 46 adjacent the forward end 47 thereof and with the tubular trimmer body 46 received within the notch 58 of the mounting block 57. Clamping plate 64 is located on the other side of the tubular trimmer body 46 and is attached to mounting block 57 by bolt 79 passing through mounting block perforation 59 and clamping plate perforation 66 and bolt 82 passing through mounting block perforation 60 and clamping plate perforation 67. In place of lock washers 80 and 83 and hex nuts 81 and 84, flat washers and wing nuts could be used, as in the embodiment of FIG. 2. It will be understood by one skilled in the art that the clamping plate 64 could be replaced by a second mounting block, as in the case of the embodiment of FIG. 2. Similarly, in the embodiment of FIG. 2 the upper mounting block 13 could be replaced by a clamping plate similar to clamping plate 64 of FIG. 5. Once mounting block 57 has been affixed to the tubular body 46 of the trimmer by the clamping action of clamping plate 64, the stems 71 and 76 of pivot members 68 and 69 are rotatively mounted in the end bores of mounting block 57, one of which is shown at 63. At this stage, the guard and guide legs 55b and 56b are inserted through transverse bores 77 and 72 of pivot members 69 and 68, respectively. Leg portions 55b and 56b are adjustably fixed in place by bolts 78 and 74, serving as set screws.

As in the case of the embodiment of FIGS. 1-4, the guard and guide assembly of the embodiment of FIGS. 5-8 can be finally adjusted on trimmer 45 by shifting mounting block 57 and clamping plate 64 along the tubular body 46 of the trimmer 45. Further adjustments can be made by shifting leg portions 55b and 56b in their respective pivot member bores 77 and 72, respectively.

As in the case of the embodiment of FIGS. 1-4, the pivot members 68 and 69 enable the guard 53 to be shifted between its operative position shown in FIG. 5 and a retracted, inoperative position (not shown) wherein its arcuate portion 54 lies against the trimmer tubular body 46 above mounting block 57. To shift the guard and guide 53 to its inoperative position, the guard and guide 53 is simply rotated, together with pivot members 68 and 69 in the direction of arrow D in FIG. 6.

The operative position of guard and guide 53 is determined by abutment of leg portions 55b and 56b against stops 62 and 61, respectively. When in its operative position, the arcuate portion 54 of the guard and guide 53 extends away from the operator and overlies the forward part of the path of travel of filament segment 52, just above the filament segment. The radius of the guard and guide segment 54 is such that the guard and guide segment extends just beyond the free end of filament segment 52.

Figure 6:
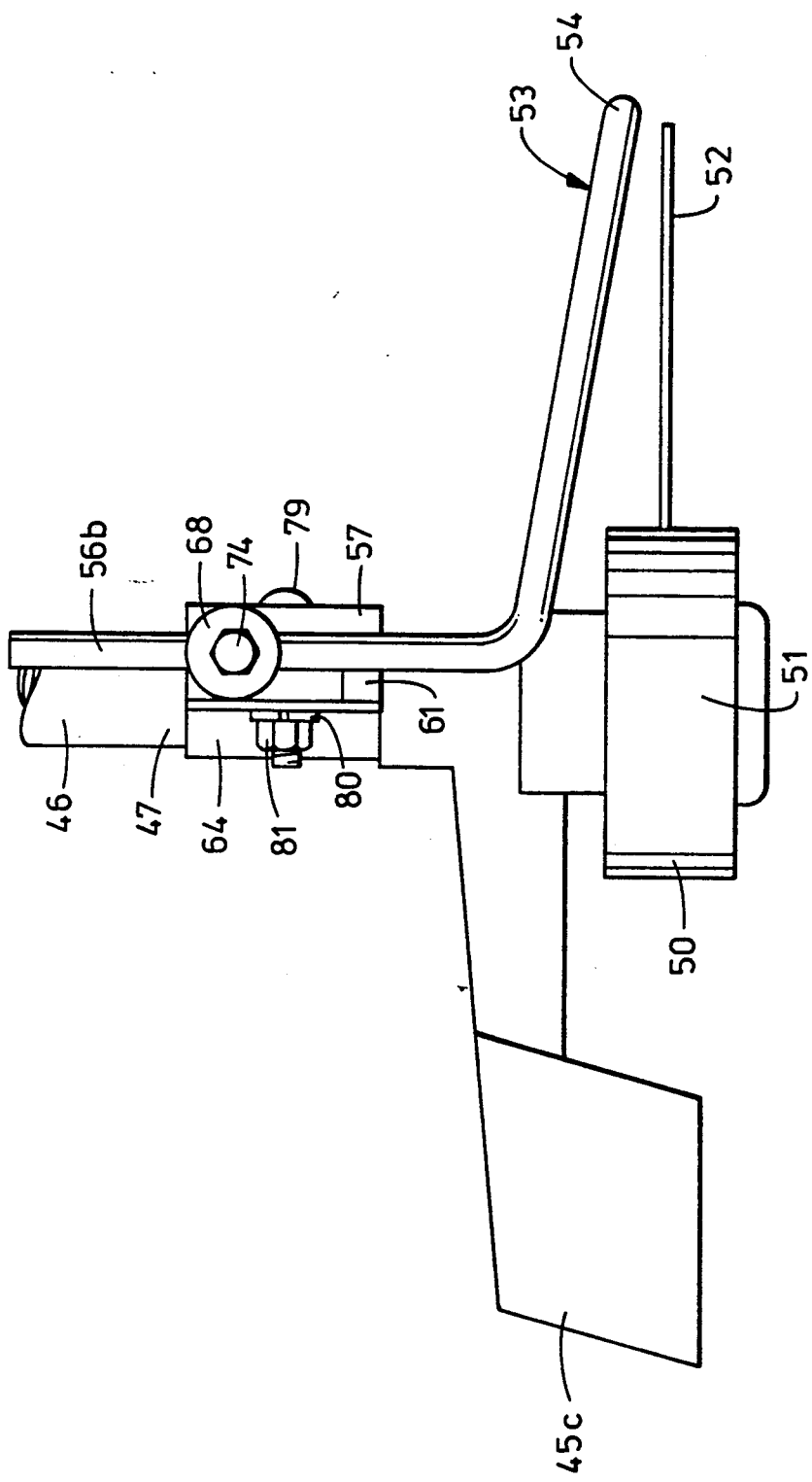
FIG. 6 is an enlarged fragmentary side elevational view of the structure of FIG. 5.

Referring to FIG. 6, it has been found that angle E should be about 100°. Again, however, it is well within the scope of the worker in the art to modify angle E or the radius of the guard and guide arcuate portion 54 so that the guard and guide assembly properly fits a given model of grass and weed trimmer.

Figure 9:
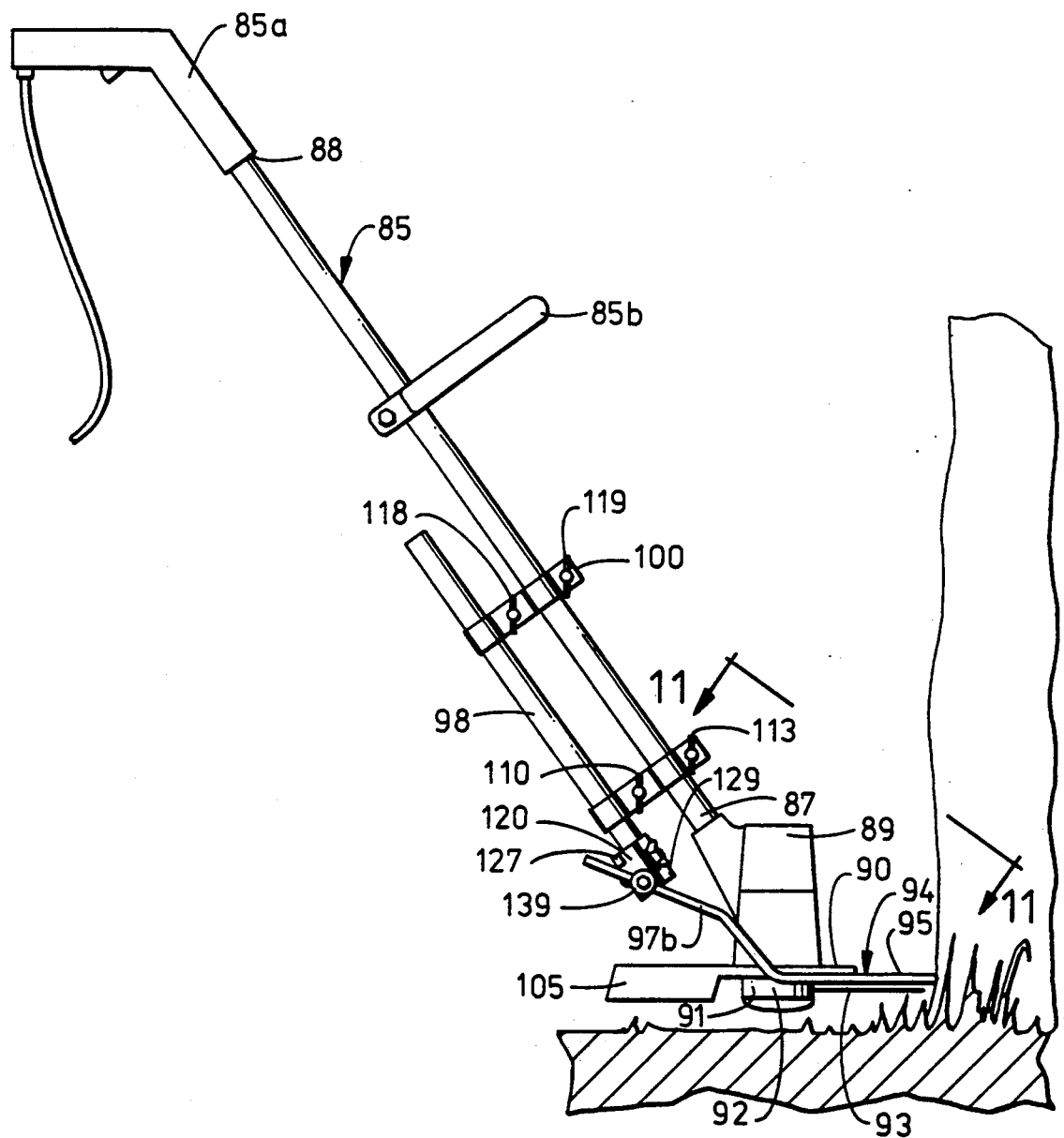
FIG. 9 is a side elevational view of another trimmer provided with yet another embodiment of the guard and guide assembly of the present invention.

Reference is now made to FIGS. 9-12. In FIG. 9 an exemplary electrically powered trimmer is generally indicated at 85. The trimmer 85 comprises an elongated, rectilinear, tubular body 86 having a forward end 87 and a rearward end 88. Attached to the forward end 87 there is an electric motor 89. The motor 89 is mounted on a head 90 carrying a spool 91 of the thread-like filament 92. A segment 93 of the filament 92 extends from spool 91 and constitutes the means by which the grass and weeds are trimmed. Means (not shown) are provided to operatively connect the shaft (not shown) of the electric motor 89 to the spool 91.

With appropriate configuration of the guard and guide 94 of the guard and guide assembly of this embodiment, the guard and guide could be mounted directly to the trimmer body 86 in a manner similar to the embodiment of FIGS. 1-4 or the embodiment of FIGS. 5-8. For purposes of an exemplary showing, however, a somewhat modified guard and guide assembly is illustrated, enabling the guard and guide 94 thereof to be substantially identical to the guard and guide 9 of the embodiment of FIGS. 1-4. To this end, the guard and guide 94 may be made of tempered aluminum rod stock or the equivalent and is provided with an arcuate forward portion 95. The ends of arcuate portion 95 terminate in legs 96 and 97 equivalent to legs 11 and 12 of the guard and guide 9. The legs 96 and 97 have first upwardly, inwardly and rearwardly extending portions 96a and 97a, equivalent to leg portions 11a and 12a of FIG. 4. The leg portions 96a and 97a terminate, respectively, in leg portions 96b and 97b, which extend upwardly and rearwardly in parallel spaced relationship and are equivalent to leg portions 11b and 12b of FIG. 4.

Figure 10:
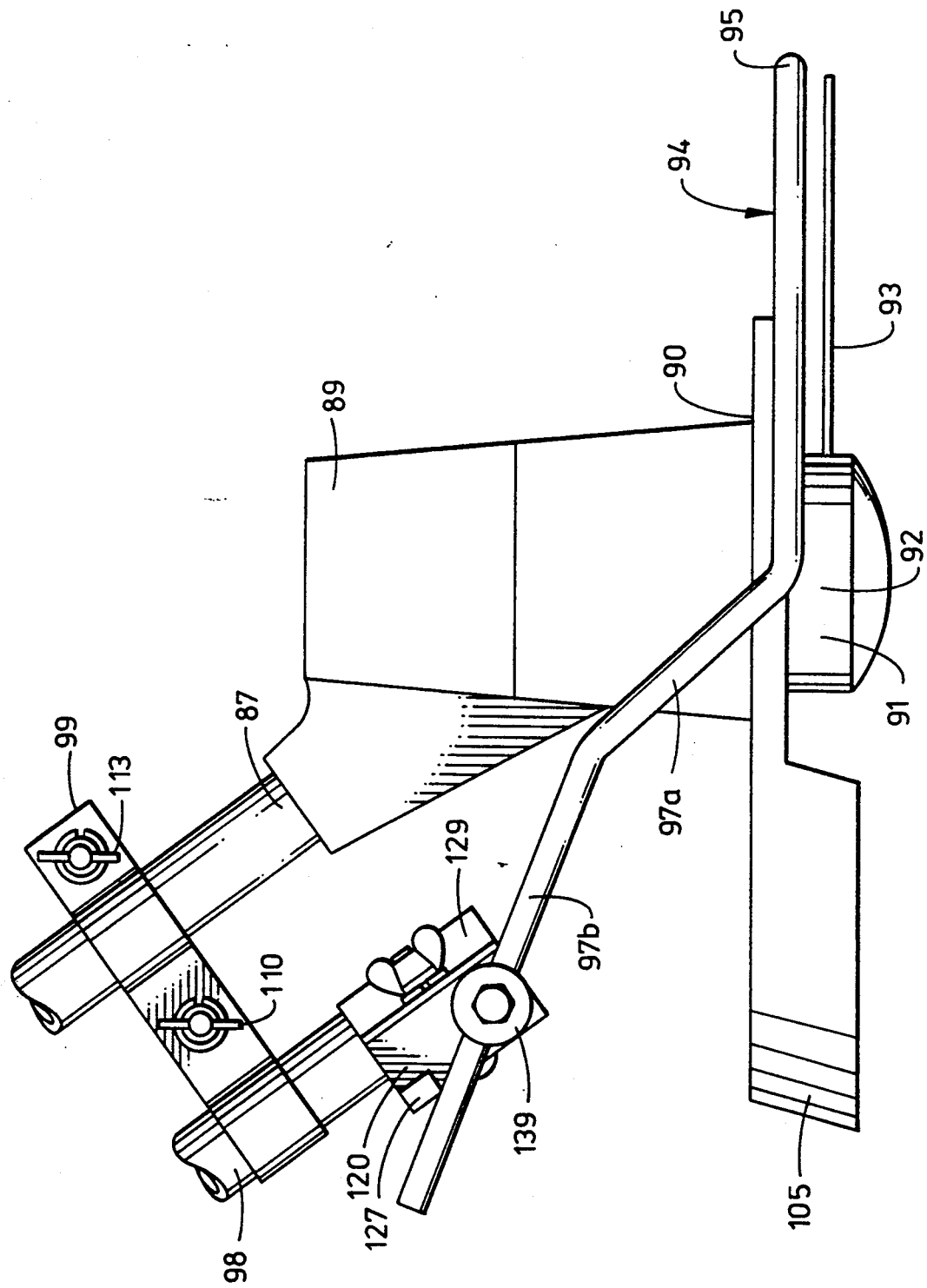
FIG. 10 is a fragmentary enlarged side elevational view of the structure of FIG. 9.
Figure 11:
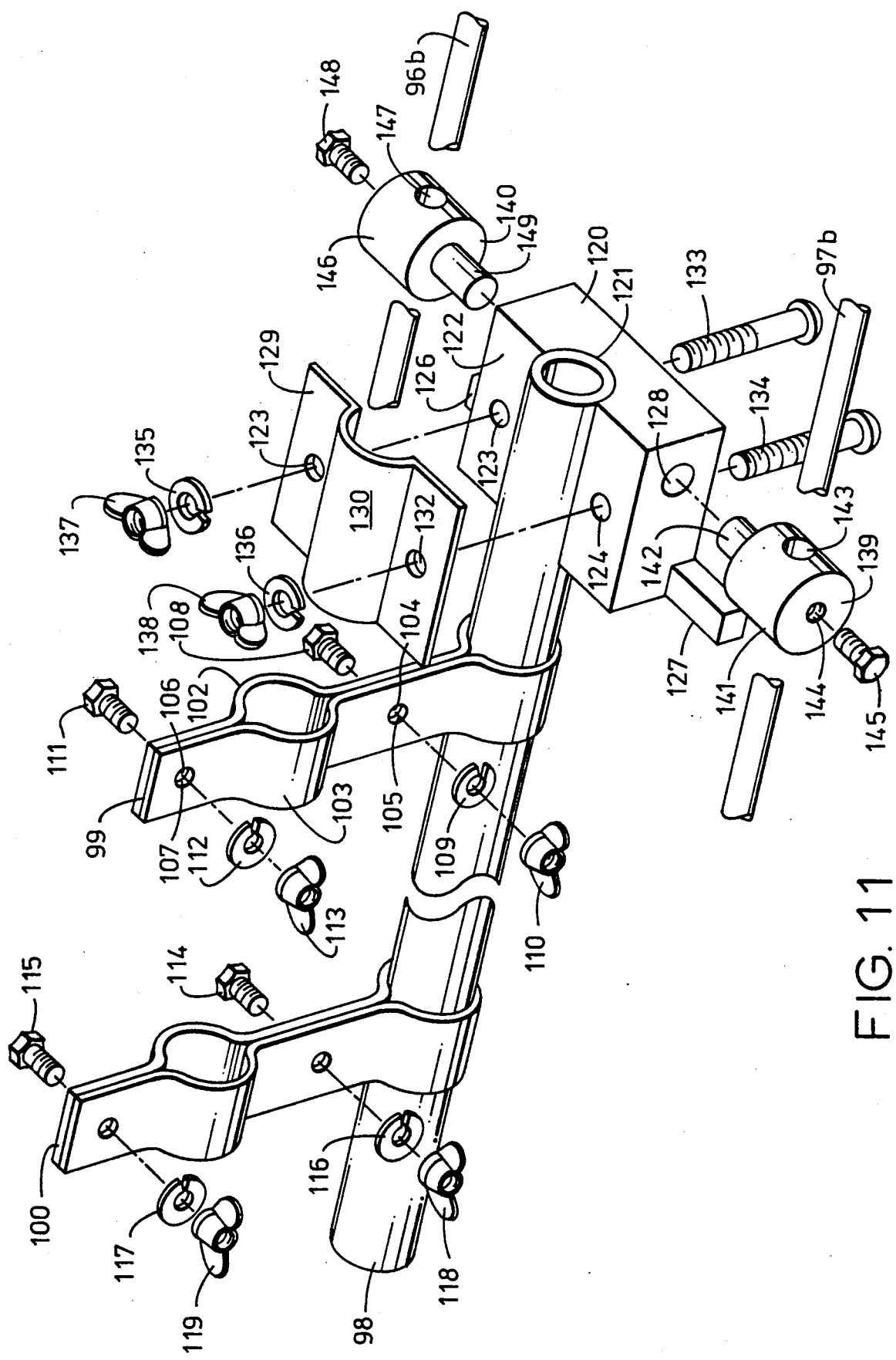
FIG. 11 is a fragmentary exploded view of the guard and guide assembly of FIG. 9.
Figure 12:
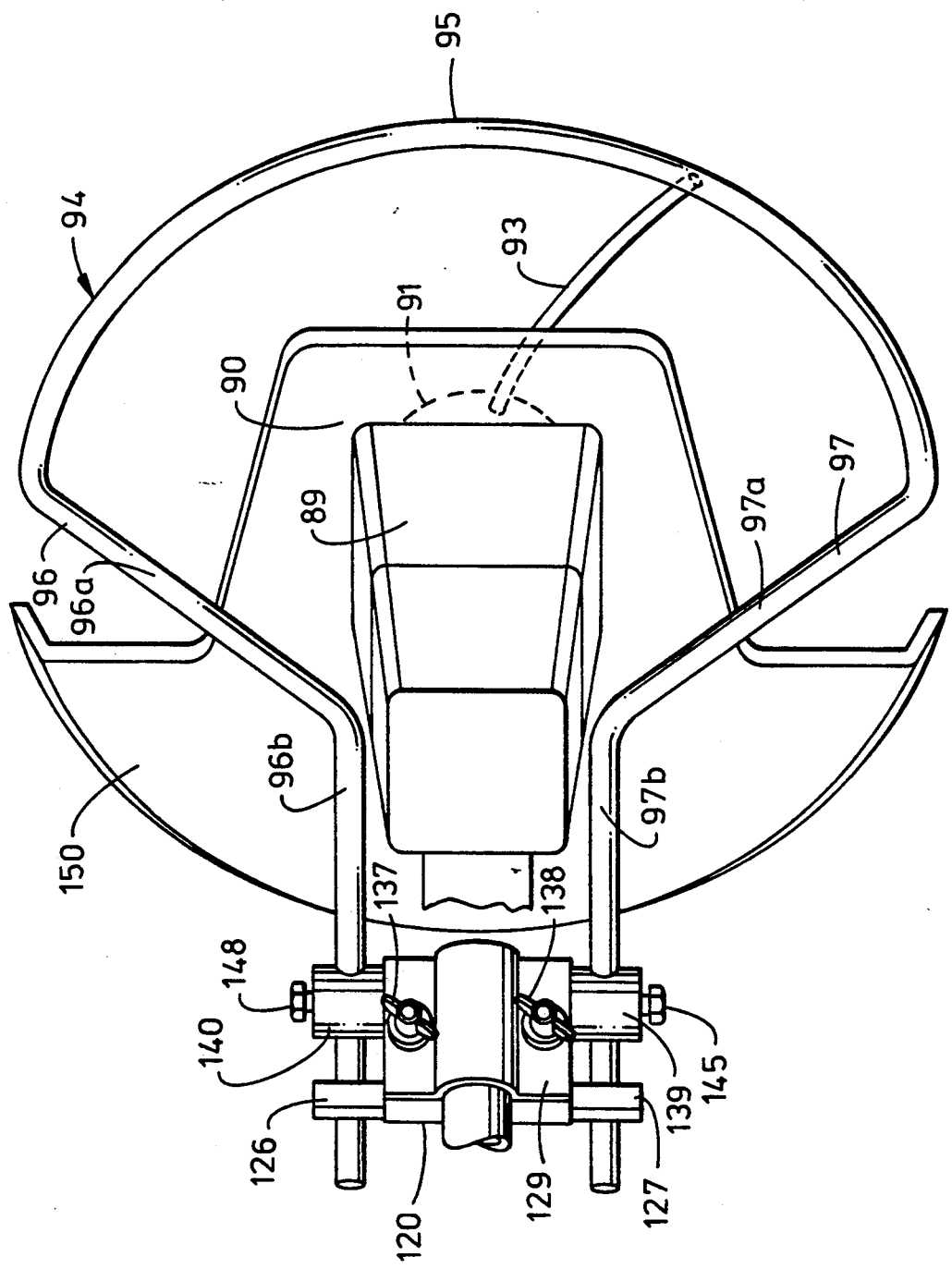
FIG. 12 is a view of the embodiment of FIG. 9 as seen a line 11—11 of FIG. 9.

Reference is now made to FIGS. 9, 10 and 11. In order to accommodate the guard and guide 94, it must be mounted somewhat behind the tubular body 86 of trimmer 85. To this end, a short, auxiliary tubular body element 98 is provided. The auxiliary tubular body element 98 constitutes part of the guard and guide assembly and is attached to the tubular body 86 of trimmer 85 by clamping straps 99 and 100. Clamping strap 99 comprises a generally U-shaped member having an arcuate portion 101 at its base adapted to extend about and clamp against auxiliary body element 98. The legs of clamping strap 99 are provided with opposed, substantially semi-circular depressions 102 and 103 adapted to receive and clamp against the tubular body 86 of trimmer 85. Clamping strap 99 is provided with coaxial pairs of perforations 104-105 and 106-107. The perforations 104-105 are adapted to receive a bolt 108 provided with a flat washer 109 and a wing nut 110. Similarly, the perforations 106-107 are adapted to receive a bolt 111 provided with a flat washer 112 and a wing nut 113.

It will be understood that the clamping strap 100 is identical to the clamping strap 99 and is provided with bolts 114 and 115, which are respectively provided with flat washers 116 and 117 and wing nuts 118 and 119. It will be apparent from FIG. 9 that when the auxiliary body element 98 is clamped to the trimmer body 86, it is located rearwardly of the trimmer body 86 and in parallel spaced relationship thereto.

The guard and guide assembly of FIGS. 9-12 includes a mounting block 120. The mounting block has a semi-circular notch 121 formed in its upper surface 122. It is also provided with a pair of bores 123 and 124 which extend from its upper face 122 through its lower face 125. The ends of mounting block 120 are provided with laterally extending stops 126 and 127. The mounting block ends are also provided with coaxial perforations, one of which is shown at 128.

Figure 7:
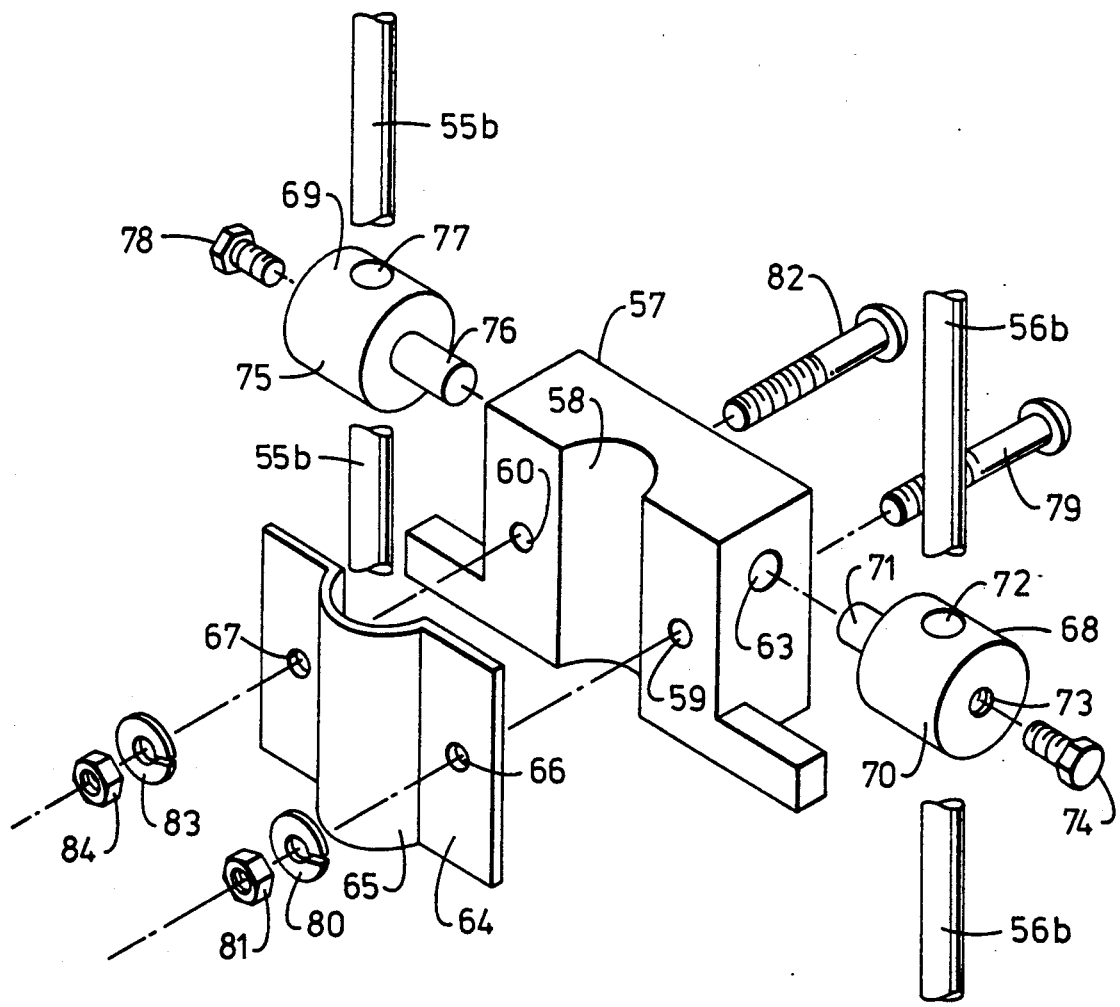
FIG. 7 is a fragmentary exploded view of the guard and guide assembly of FIG. 6.
Figure 8:
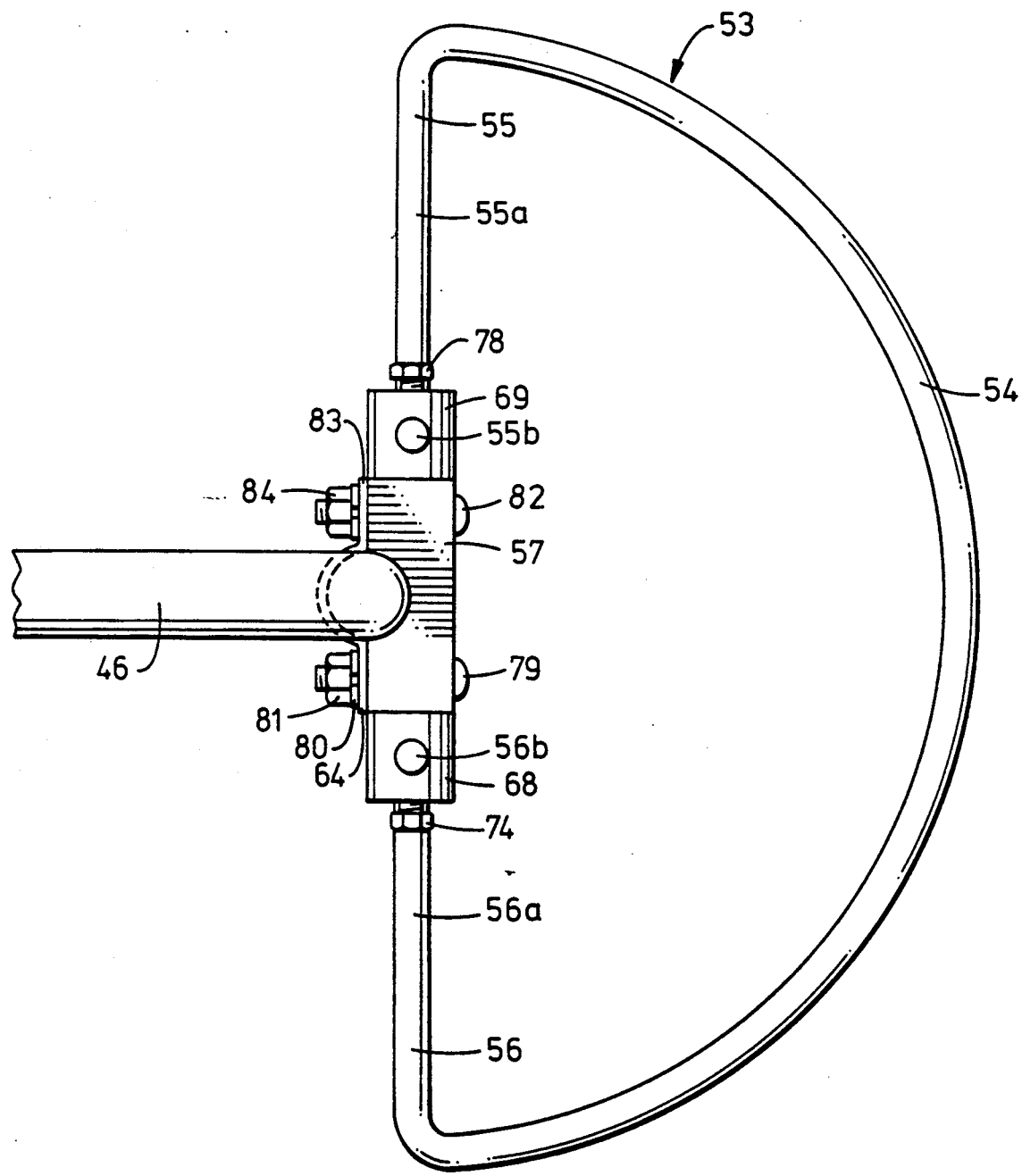
FIG. 8 is a fragmentary plan view of the guard and guide assembly of FIG. 6.

Mounting block 120 is adapted to cooperate with a clamping plate 129 similar to clamping plate 64 of FIG. 7. Clamping plate 129 has a central semi-circular bend 130 and a pair of perforations 131 and 132. A pair of bolts 133 and 134, a pair of flat washers 135 and 136 and a pair of wing nuts 137 and 138 complete the mounting block clamping plate subassembly. The mounting block 120 is also adapted to support a pair of pivot members 139 and 140. These pivot members are identical to pivot members 34 and 35 of FIG. 3. To this end, pivot member 139 has a cylindrical body 141 and a cylindrical stem 42. A transverse bore 143 is provided in cylindrical body 141, together with an axial bore 144 which intersects the transverse bore 143. Axial bore 144 is threaded and adapted to receive bolt 145. In similar fashion, the pivot member 140 has a cylindrical body 146 provided with a transverse bore 147 and an axial bore (not shown) equivalent to axial bore 144 and adapted to receive bolt 148. The pivot member 140 is completed by a stem 149.

The auxiliary tubular body 8 is clamped in clamping straps 99 and 100 by means of bolts 108 and 114. The clamping straps 99 and 100 are thereafter clamped to the tubular body 86 of trimmer 85 by means of bolts 106 and 115. Mounting block 120 may be affixed to auxiliary body member 98 before or after its attachment to trimmer body 86. The mounting block 120 is located at the forward end of auxiliary body member 98 with the forward end of auxiliary body member 98 located in notch 121. The mounting block 120 is clamped to the auxiliary body member 98 by means of clamping strap 129, bolts 133 and 134, washers 135 and 136 and wing nuts 137 and 138. Thereafter, the pivot members 139 and 140 are mounted on the mounting block ends and the parallel leg portions 97b and 96b are inserted in the pivot member transverse perforations 143 and 147, respectively, and are locked in place by bolts 145 and 148, acting as set screws.

Again, it will be apparent that final adjustment can be made by loosening bolts 133 and 134 and shifting the mounting block axially of the auxiliary body member 98. When the desired position of the mounting block 120 is achieved, the bolts 33, 133 and 134 are again tightened. Additional adjustment can be made by shifting the leg portions 96b and 97b in their respective pivot member perforations 147 and 143, the bolts 148 and 145 being used to lock them in final position.

As in the case of the previously described embodiments of FIGS. 1-4 and 5-8, the pivot members 139 and 140 permit the guard and guide assembly 94 to be shifted between its operative position shown in FIGS. 9 and 11 and a retracted, inoperative position (not shown) wherein the arcuate portion 95 of the guard and guide 94 lies against the trimmer tubular body 46. The operative position of the guard and guide 94 is determined by abutment of leg portions 96b and 97b against stops 126 and 127, as shown in FIGS. 9, 10 and 11. When in its operative position, the arcuate portion 95 of the guard and guide 94 extends away from the operator and overlies the forward part of the path of travel of filament segment 93. The radius of the guard and guide segment 95 is such that the guard and guide segment extends just beyond the free end of filament segment 93.

For purposes of an exemplary showing, the embodiment of FIGS. 9-12 is illustrated as being provided with a shield 150. The shield 150 faces the operator and protects the operator from the rotating filament 93 as well as sticks, gravel, stones and other debris which might otherwise be thrown toward the operator by the rotating filament. The trimmer is also shown having means 85a and 85b by which the operator can manually grasp and control the trimmer 85.

Modifications may be made in the invention without departing from the spirit of it.

What is claimed is:

1. A guard and guide assembly for a powered operator hand-held grass and weed trimmer having a trimming means in the form of a flexible, string-like filament segment extending from a spool of said filament and having a free end, said trimmer comprising an elongated tubular body having forward and rearward ends, means to rotatively and releasably support said spool and trimming filament segment at said forward end of said trimmer body, prime mover means mounted on said trimmer and operatively connected to said spool to rotate said spool and filament segment at high speed in a circular path of travel, said guard and guide of said assembly comprising an element having a forward portion with an arcuate peripheral configuration and an upwardly, inwardly, and rearwardly extending rearward portion, said guard and guide assembly including means to operatively attach said guard and guide to said trimmer body, said guard and guide having an operative position wherein its arcuate portion extends away from said operator and overlies the forward portion of said circular path of travel of said filament segment and extends slightly beyond said free end of said filament segment.

2. The guard and guide assembly claimed in claim 1 wherein said attachment is pivotal and said guard and guide is swingable between said operative position and an inoperative retracted position wherein said semi-circular portion thereof rests against said tubular trimmer body above said mounting means.

3. The guard and guide assembly claimed in claim 2 wherein said guard and guide is formed of rod-like material, said rod-like material being formed into a substantially semicircular arcuate portion comprising said forward portion of said guard and guide, said arcuate portion terminating at its ends in rearwardly, inwardly and upwardly extending legs comprising said rearward portion of said guard and guide.

4. The guard and guide assembly claimed in claim 3 wherein said prime mover is mounted on said rearward end if said trimmer tubular body and has a drive shaft, said trimmer tubular body being rectilinear, said prime mover drive shaft being operatively connected to said spool by means including shaft means extending through said tubular trimmer body and gear means at said forward end thereof, said guard and guide attachment means comprising a mounting block adjustably clamped to said tubular trimmer body and extending transversely thereof, said mounting block having ends extending laterally of said tubular trimmer body, a pivot member rotatively mounted on each end of said mounting block, the free end portions of said guard and guide legs being coplanar and in parallel spaced relationship, each of said pivot members having a transverse bore to receive said free end portion of one of said legs and a set screw to adjustably clamp said free end portion thereof.

5. The guard and guide assembly claimed in claim 4 wherein said prime mover is an internal combustion engine.

6. The guard and guide assembly claimed in claim 4 wherein said prime mover is an electric motor.

7. The guard and guide assembly claimed in claim 4 including stop means on the ends of said mounting bock cooperating with said free end portions of said legs to determine said operative position of said guard and guide.

8. The guard and guide assembly claimed in claim 3 wherein said prime mover is mounted on said rearward end of said trimmer tubular body and has a drive shaft, said trimmer tubular body being rectilinear throughout most of its length and curving gently downwardly nears its forward end so as to be substantially coaxial with said spool, said prime mover drive shaft being operatively connected to said spool by means including flexible shaft means extending through said tubular trimmer body, said guard and guide attachment means comprising a mounting block adjustably clamped to said tubular trimmer body and extending transversely thereof, said mounting block having ends extending laterally of said tubular trimmer body, a pivot member rotatively mounted on each end of said mounting block, the free end portions of said guard and guide legs being coplanar and in parallel spaced relationship, each of said pivot members having a transverse bore to receive said free end portion of one of said legs and a set screw to adjustably clamp said free end portion therein.

9. The guard and guide assembly claimed in claim 8 wherein said prime mover is an internal combustion engine.

10. The guard and guide assembly claimed in claim 8 wherein said prime mover is an electric motor.

11. The guard and guide assembly claimed in claim 8 including stop means on the ends of said mounting bock cooperating with said free end portions of said legs to determine said operative position of said guard and guide.

12. The guard and guide assembly claimed in claim 3 wherein said prime mover is mounted at the forward end of said trimmer tubular body and has a drive shaft, means operatively connecting said drive shaft to said spool. Said guard and guide attachment means comprising a short auxiliary body element affixed to and rearwardly of said trimmer tubular body in parallel spaced relationship thereto. A mounting block adjustably clamped to said tubular body element and exiting laterally thereof, a pivot member rotatively mounted on each end of said mounting block, the free end portions of said guard and guide legs being coplanar and in parallel spaced relationship. Each of said pivot members having a transverse bore to receive said free end portion of one of said legs and a set screw to adjustably clamp said leg free end portion therein.

13. The guard and guide assembly claimed in claim 12 wherein said prime mover is an internal combustion engine.

14. The guard and guide assembly claimed in claim 12 wherein said prime mover is an electric motor.

15. The guard and guide assembly claimed in claim 12 including stop means on the ends of said mounting bock cooperating with said free end portions of said legs to determine said operative position of said guard and guide.

16. The guard and guide assembly claimed in claim 1 wherein said guard and guide is formed of rod-like material, said rod-like material being formed into an arcuate portion comprising said forward portion of said guard and guide, said arcuate portion terminating at its ends in rearwardly, inwardly and upwardly extending legs comprising said rearward portion of said guard and guide.

17. The guard and guide assembly claimed in claim 16 wherein said guard and guide is made of tempered aluminum rod stock.

18. The guard and guide assembly claimed in claim 1 wherein said mounting means therefore are adjustable.

* * * * *

UNITED STATES PATENT AND TRADEMARK OFFICE
CERTIFICATE OF CORRECTION

PATENT NO. : 5,010,720

DATED : April 30, 1991

INVENTOR(S) : Louis V. Corsi

It is certified that error appears in the above-identified patent and that said Letters Patent is hereby corrected as shown below:

Claim 4 - Column 10 - Line 21 - "if" should be deleted and replaced with -- of --

Claim 8 - Column 10 - Line 52 - "nears" should be deleted and replaced with -- near --

Claim 11 - Column 11 - Line 7 - "bock" should be deleted and replaced with -- block --

Claim 12 - Column 11 - Line 16 - the period after "spool" should be replaced with -- , --; "Said" should be deleted and replaced with -- said --

Claim 12 - Column 11 - Line 19 - the period after "thereto" should be deleted and replaced with -- , --; "A" should be deleted and replaced with -- a --

Claim 12 - Column 11 - Line 20 - "exiting" should be deleted and replaced with -- extending --

Claim 12 - Column 11 - Line 25 - the period after "relationship" should be deleted and replaced with -- , --; "Each" should be deleted and replaced with -- each --

UNITED STATES PATENT AND TRADEMARK OFFICE
CERTIFICATE OF CORRECTION

PATENT NO. : 5,010,720

DATED : April 30, 1991

INVENTOR(S) : Louis V. Corsi

It is certified that error appears in the above-identified patent and that said Letters Patent is hereby corrected as shown below:

Claim 15 - Column 12 - Line 9 - "bock" should be deleted and replaced with --block--

Signed and Sealed this

Thirteenth Day of October, 1992

*Attest:*

DOUGLAS B. COMER

*Attesting Officer*   *Acting Commissioner of Patents and Trademarks*